United States Patent [19]
Demaree

[11] Patent Number: 5,893,320
[45] Date of Patent: Apr. 13, 1999

[54] DEVICE FOR COOKING FOWL

[76] Inventor: Michael S. Demaree, 990 Scenic Dr., Porterville, Calif. 93258

[21] Appl. No.: 08/859,619

[22] Filed: May 20, 1997

[51] Int. Cl.⁶ ....................................... A47J 43/18
[52] U.S. Cl. ................ 99/419; 99/447; 219/725; 219/732
[58] Field of Search ................ 99/419, 421 V, 99/347, 346, 345, 426, 446, 447; 219/725, 730, 732

[56] References Cited

U.S. PATENT DOCUMENTS

| | | | |
|---|---|---|---|
| 3,280,907 | 10/1966 | Hoffman | 99/419 X |
| 4,450,759 | 5/1984 | Steibel | 99/426 X |
| 5,106,642 | 4/1992 | Ciofalo | 99/421 V X |
| 5,301,602 | 4/1994 | Ryczek | 99/426 X |

*Primary Examiner*—Reginald L. Alexander
*Attorney, Agent, or Firm*—Lyon & Lyon LLP

[57] ABSTRACT

A device for improving the process of cooking fowl in a heated chamber, resulting in a cooked food that is nutritious, tasty, and low in fat content. The device includes an insert or mount that fits within the interior cavity of the fowl to be cooked. The device may also include a base plate connected to the insert or mount which is oriented vertically and holds the fowl upright to promote drainage of exuded liquidified fat. The device may also cause and/or promote convective, radiative, and conductive heating of the interior of the fowl while it is being cooked in the heated chamber. Finally, the device may contain liquids and also additives such as spices, with the liquid being vaporized and emitted through an aperture in the top portion of the insert or mount and then perfused through and forced out from the interior cavity of the fowl.

19 Claims, 8 Drawing Sheets

DEVICE FOR COOKING FOWL

FIELD OF THE INVENTION

The field of the invention generally relates to a cooking device for cooking fowl.

DESCRIPTION OF THE RELATED ART

Fowl, primarily chickens, have been a food staple throughout the world for centuries. There are varied methods for cooking fowl. The fowl may be boiled, boiled under pressure, deep fried, pan-fried, microwaved, barbecued, or roasted (baked), or any combination of these processes. The reason for choosing one method over another is primarily the taste (which, as used herein, is meant to include the qualities of flavor, tenderness, texture, and appearance) imparted by the cooking process. Various additives may also be used in the process to affect the taste of the cooked fowl, such as spices, fruits or vegetables, stuffings, marinades or sauces. The additives desired and the ease with which the additives can be applied may also affect the desirability of the different processes. Other factors are simplicity, availability equipment, and available materials such as oil for deep frying.

Recently, the eating of fowl has been determined to be less detrimental to health than other meats, such as red meats, and the lower the residual fat content of the cooked fowl the more desirable the fowl as a nutrition source.

Therefore, at the present time the two factors most important in the cooking of fowl are the taste and the residual fat content. Boiled fowl is tender and allows fat to be removed from the resulting broth, but additives in the boiling liquid have little effect on the taste of the fowl, and the flavor, texture, and appearance of the fowl is not desirable. Fowl boiled under pressure (pressure cooked) is tender with reasonable texture, but again additives have little effect resulting in poor flavor, with poor appearance and high residual fat content. Fowl pan-fried or deep fried, where additives are in the form of seasoned coatings or batters, has good flavor, appearance and texture, but has an extremely high residual fat content. Microwaved fowl may have good texture and tenderness, but is minimally affected by additives, with marginal flavor and very poor appearance with a high residual fat content. Barbecued fowl generally has a thick and highly flavorful additive coating which makes a good flavor and appearance, but can be dry and tough with a high residual fat content. Roasted fowl has good appearance, reasonable response to additives resulting in good flavor, and good texture, but may be dry and tough and often has a high residual fat content.

A great improvement on the processes for cooking fowl is the "vertical roaster," which is a rack that allows the fowl to be placed in a pan in a vertical position. While retaining advantages of regular roasting, such as good appearance, reasonable response to additives resulting in fairly good flavor, and good texture, the vertical roaster allows fat to drain from the fowl during the cooking process, resulting in a very low residual fat content. Regretfully, fowl cooked in the vertical roaster, if cooked completely, may still be somewhat dry and tough, and if not cooked completely in order to avoid such dryness, may present serious health risks.

Accordingly, because the taste of cooked fowl will determine its popularity and incorporation into modern diets as a red meat substitute, thereby affecting general dietary health trends, there continues to be a need for a method of cooking fowl which results in nutritional food which is fully cooked without being dry or tough, and which has maximal taste (including flavor, texture, appearance, and tenderness) and minimal residual fat content.

There is also a need for such a method of cooking which also allows for the easy incorporation of desired additives.

SUMMARY OF THE INVENTION

In one aspect of the present invention, a device for cooking fowl may consist of a base plate and a vertical mount. When a dressed fowl is mounted on the vertical mount, with the vertical mount inside the body cavity of the dressed fowl, the cooking device preferably holds that fowl in a vertical attitude, that is, with the anterior portion of the carcass as the highest point and the posterior portion of the carcass as the lowest point. When the device and mounted fowl is placed in an ordinary roasting pan in an oven or other heated chamber, the vertical attitude of the fowl allows fats to drain off into a cooking pan during the roasting process.

In another aspect of the invention, the vertical mount of the cooking device may be made of a material which is highly conductive of heat, such as aluminum. The vertical mount may then have a source of heat (including the base plate if it is also highly heat conductive), and/or the vertical mount may be exposed to radiative and/or convective heating from the surrounding heated chamber through the provision of fins on the exterior of the mount. Thus, when the cooking device and mounted fowl are placed in a heated oven, heat is constantly transferred from the oven to the vertical mount and into the inside of the body cavity of the dressed fowl. Accordingly, the fowl may be seared on both the inside and outside so as to seal in natural juices, and also be cooked from the "inside-out" in addition to the usual cooking during roasting which is usually from the "outside-in."

In a further separate aspect of the invention, the base plate may be provided with ribs to prevent the mounted fowl from resting in the fats and oils which may have drained from the fowl during the cooking process and thereby inadvertently reabsorbing or retaining unwanted fats or oils.

In a further separate aspect of the invention, both the top plate and the base plate may be readily removable from the vertical mount to facilitate cleaning of the entire cooking device.

In a further separate aspect of the invention, the vertical mount of the cooking device may be hollow and open at both ends, and the base plate may close the lower end of the vertical mount. The base plate may be attached to the vertical mount in such a way as to form a liquid-tight seal so that when liquids are placed in the vertical mount, they will not leak out where the vertical mount and base plate meet. Alternatively, the fit between the base plate and mount may be relatively loose, and a separate cup may be used to hold liquids. In either case, liquids such as water may then be introduced into and contained within the hollow vertical mount. Thus, when the cooking device with mounted fowl is placed in a heated chamber, the liquid in the vertical mount may progressively vaporize and escape through the top of the vertical mount, filling the body cavity of the fowl, keeping the fowl moist and tender during the roasting process. Additionally, various spices and other ingredients, such as wine, lemon rind, bay leaves, or additives such as LIQUID SMOKE.® may be placed into the liquid in the hollow vertical mount, so that the additives permeate and infuse the cooking fowl. In this configuration, the aforementioned "inside-out" mode of cooking may be accomplished as much through the transfer of heat from the escaped vapors or through the radiation of heat from the fins of the vertical mount as through direct contact of the mounted fowl's interior with the exterior of the vertical mount.

In a further separate aspect of embodiments of the invention utilizing a hollow vertical mount, a top plate, with a small hole in it, may partially close the upper end of the hollow vertical mount. Further, the size of the hole in the top plate may have a specific size predetermined to control the rate of escape of vaporized liquids and additives.

In a further separate aspect of embodiments of the invention utilizing a hollow vertical mount, vertical fins may be provided on the exterior of the vertical mount in order to facilitate the movement of escaped vapors by preventing the interior of the mounted fowl's body cavity from pressing continuously against the vertical mount which might prevent the free movement of vapors upwards or downwards past the outside of the vertical mount to fully permeate the body cavity to facilitate cooking processes and the dispersion of cooking additives.

BRIEF DESCRIPTION OF THE DRAWINGS

Three non-moving parts comprise the particular embodiment of the invention that is depicted in the drawings. These parts are a base plate, a vertical mount, and a top plate.

DETAILED DESCRIPTION OF A PREFERRED EMBODIMENT

Figure 1:
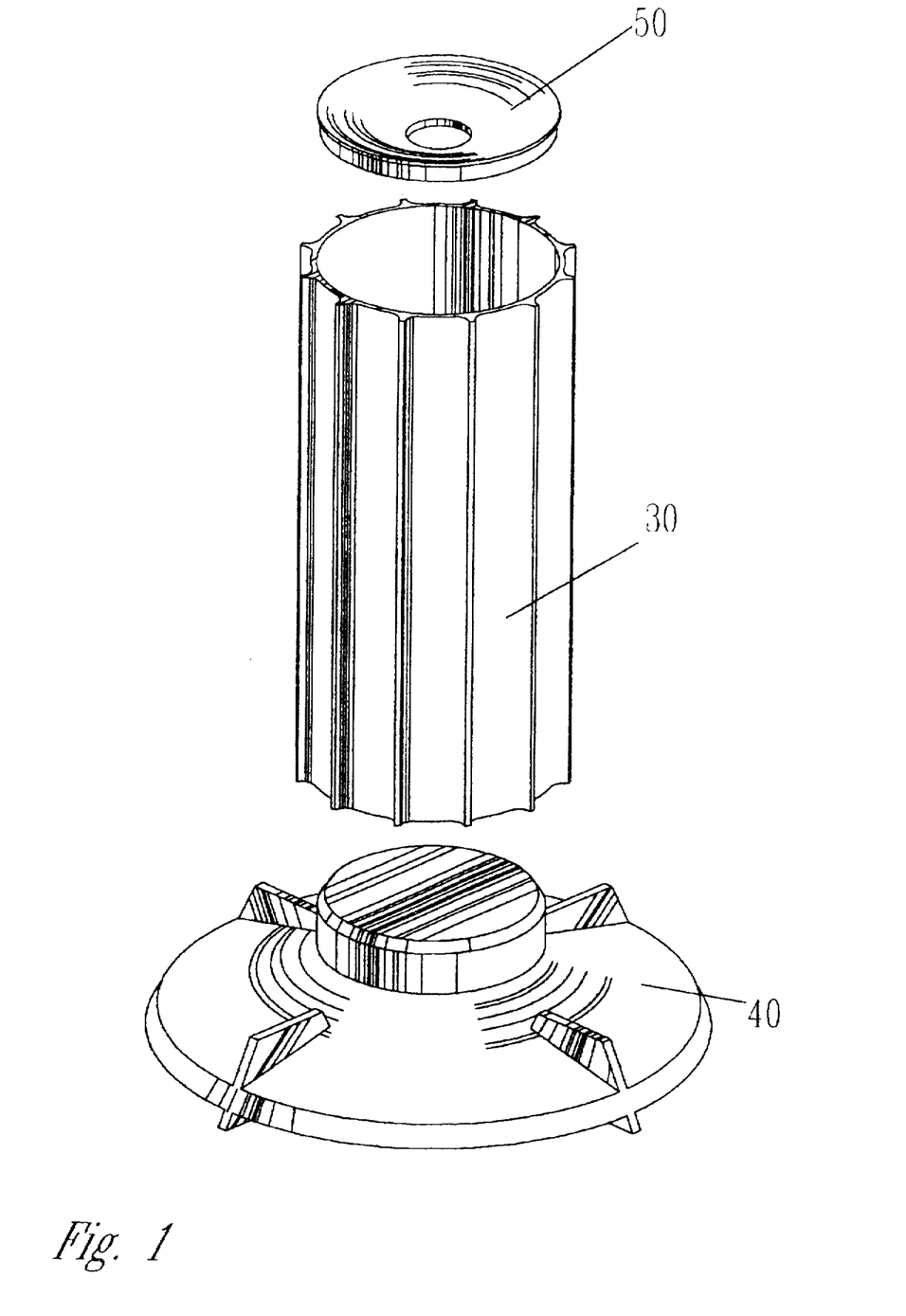
FIG. 1 shows the three parts in isometric view, unassembled.
Figure 2:
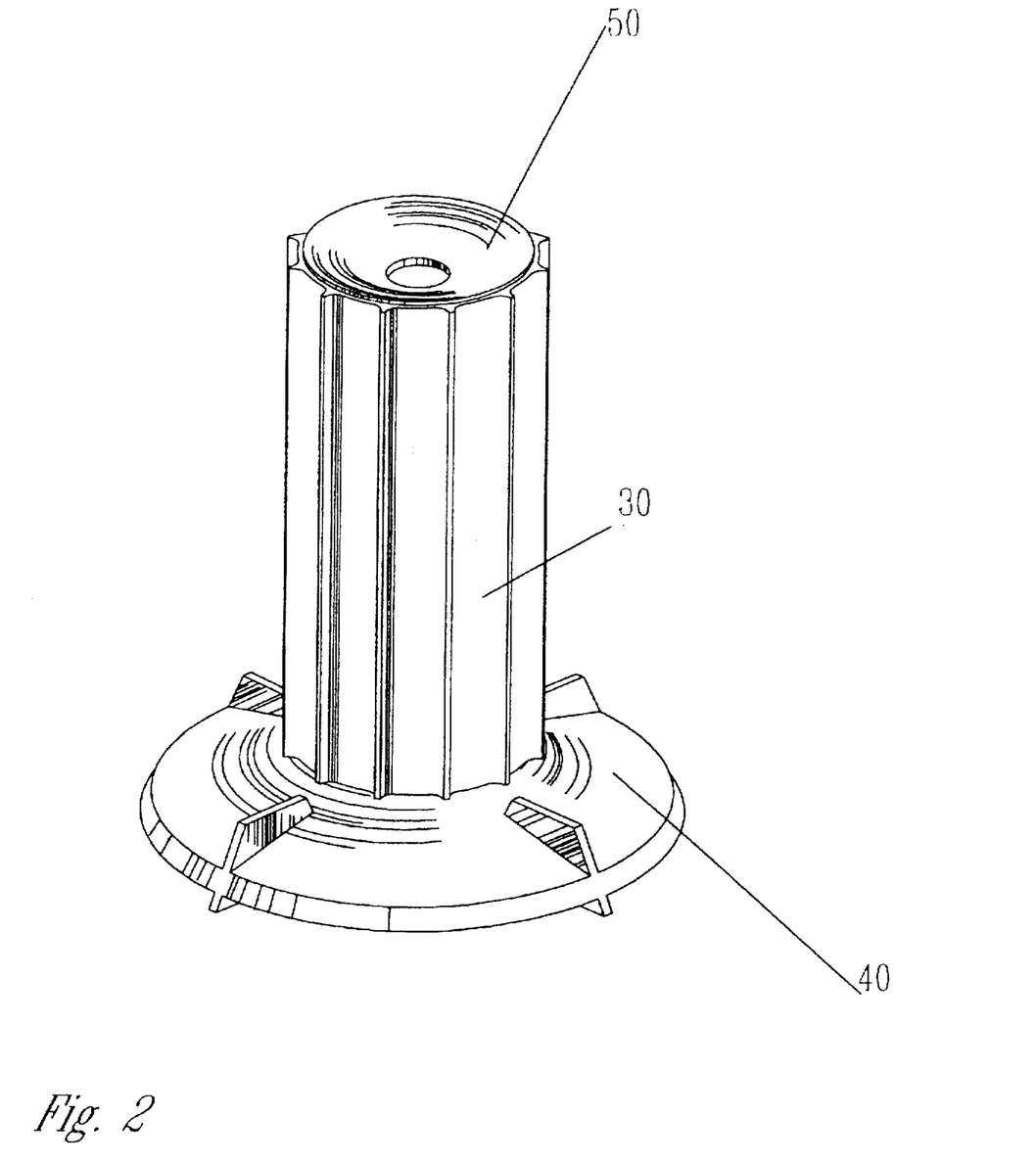
FIG. 2 shows the three parts in isometric view, assembled.
Figure 3A:
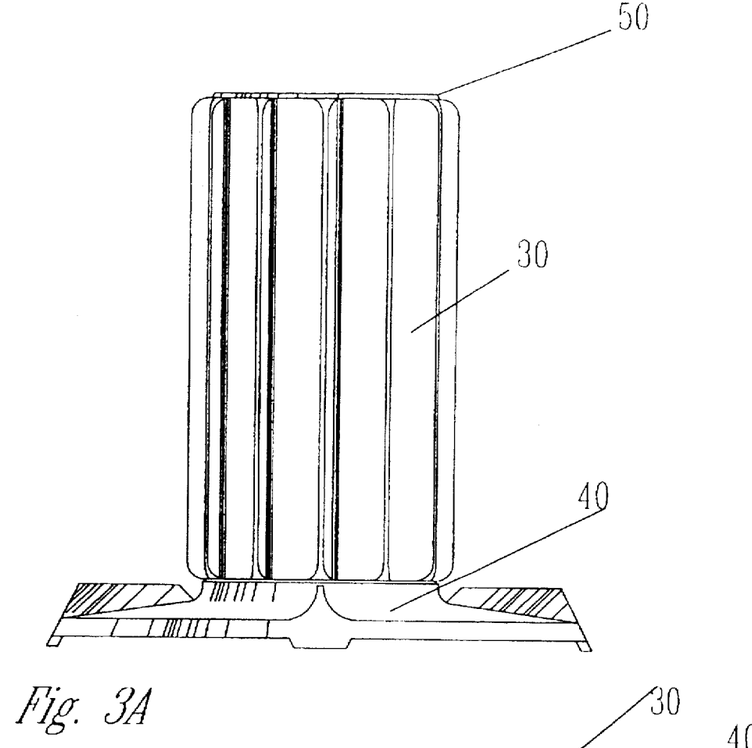
FIGS. 3a and 3b show the assembled cooking device in top and side views.
Figure 3B:
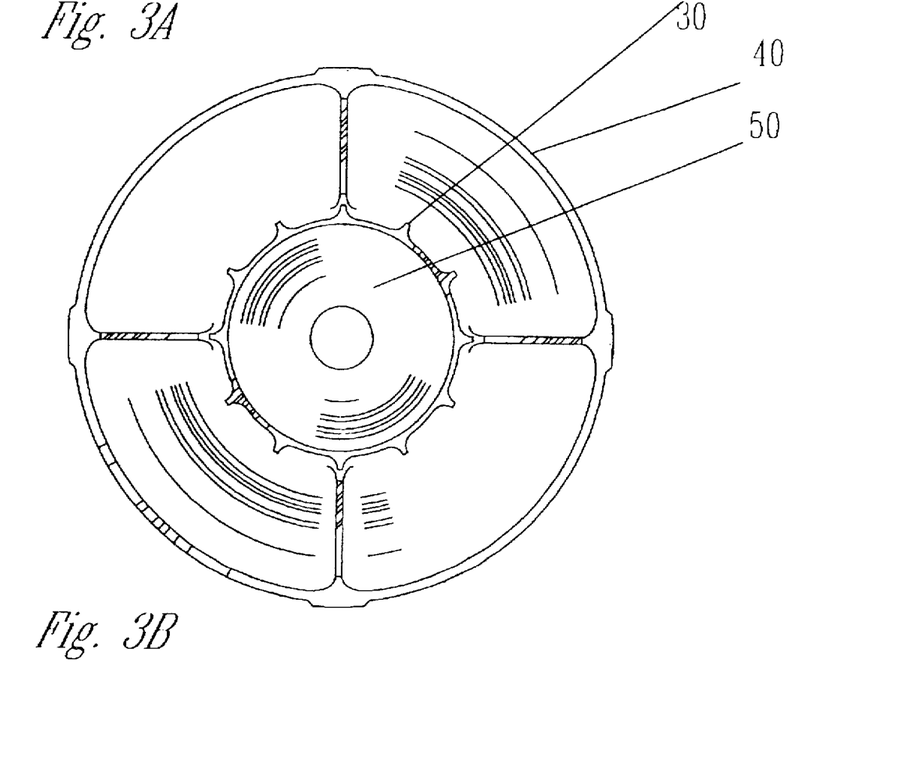

FIGS. 1-7 show a preferred embodiment having several of the inventive aspects described in the foregoing summary of the invention. FIGS. 1 and 2 show the major parts of this embodiment in isometric view, unassembled and assembled, respectively. FIG. 3 shows a side view and top view of the assembled device. As can be seen, the major component parts of this embodiment are a base plate 40, a vertical mount 30, and a top plate 50.

Figure 4A:
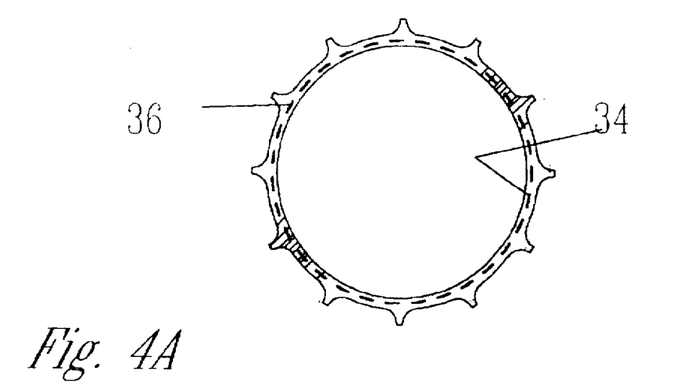
FIGS. 4a and 4b show the vertical mount in top and side views.
Figure 4B:
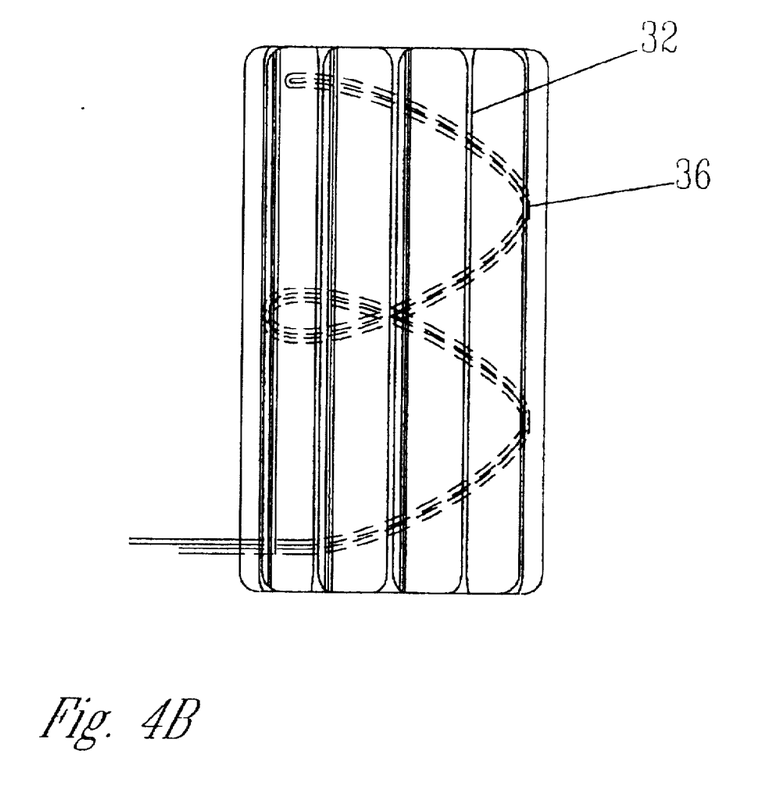

Looking now at FIG. 4, the vertical mount 30 is shown in top and side views. The fins 32 help to absorb heat into the vertical mount 30 to heat liquids and other additives which have been placed in the vertical mount 30, and also to disseminate heat which has been absorbed by the vertical mount 30 to facilitate the cooking of the interior of the body cavity of the fowl. The inner surface 34 is smooth to facilitate cleaning, and also to facilitate a good seal with both the top plate 50 and the base plate 40 while still allowing the vertical mount 30 to be easily manufactured by a variety of means, including but not limited to, extrusion. Also, an electric heating element 36 (in ghost) could optionally be embedded in the mount to produce internal heating.

Figure 5A:
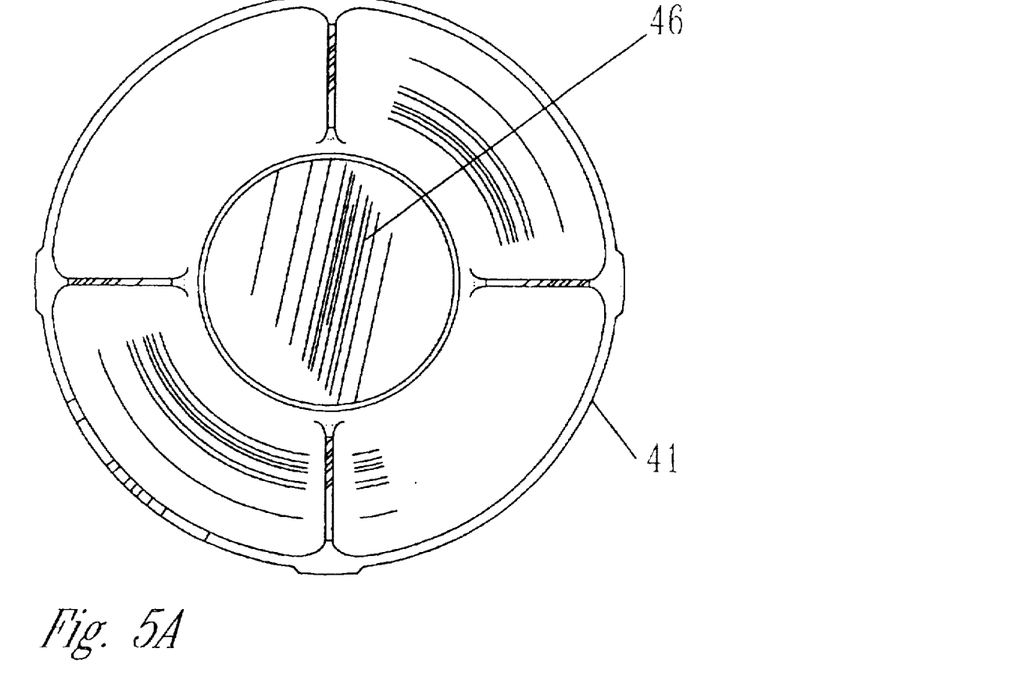
FIGS. 5a and 5b show the base plate in top and side views.
Figure 5B:
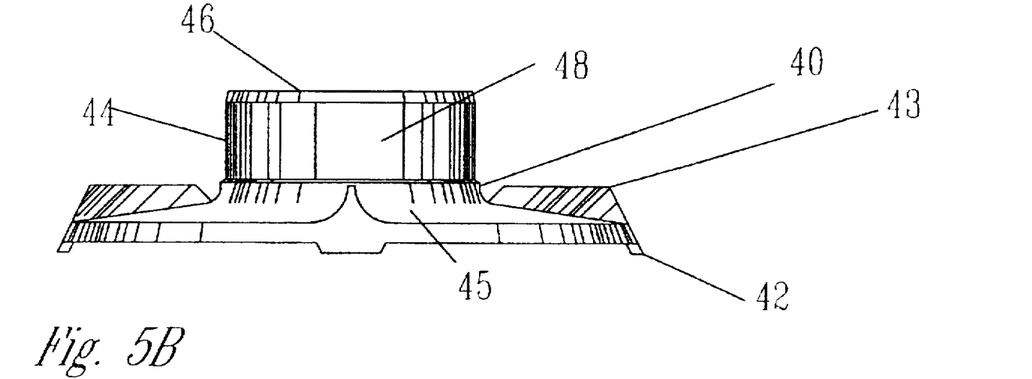

Looking now at FIG. 5, we see the base plate 40 in top and side views. The base plate 40 is round with a bottom that is flat except for periodic extensions or bumps 42, located on the under side of the base plate 40 near the outer circumference 41, and allowing for the movement of liquids or gases between base plate 40 and any pan or other flat surface on which the base plate 40 is set. At its bottom, the upper surface 45 of the base plate 40 adjoins the outer circumference 41 and is a cone of extremely low height; moving upwardly, surface 45 curves into a steeper cone that is truncated and meets the bottom edge of the cylinder 44. The wall 48 of the cylinder 44 is almost identical in cross-section to the inner surface 34 of the vertical mount 30, and, along with an adjoining top core 46, serves to receive the bottom of the vertical mount 30, and to hold it firmly so that it cannot tip or fall, and to also create a liquid-tight seal between the vertical mount 30 and the base plate 40. There are also ribs 43 extending upwardly from the upper surface 45 and radially from the cylinder 44, to prevent the fowl from contacting fats or oils drained from the fowl during cooking.

Figure 6A:
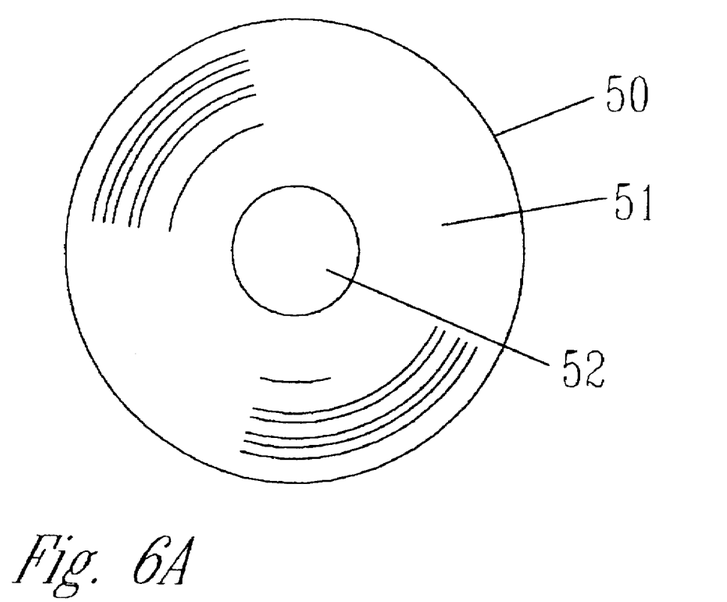
FIG. 6 shows the top plate in top, side, and side cross-section views.
Figure 6B:
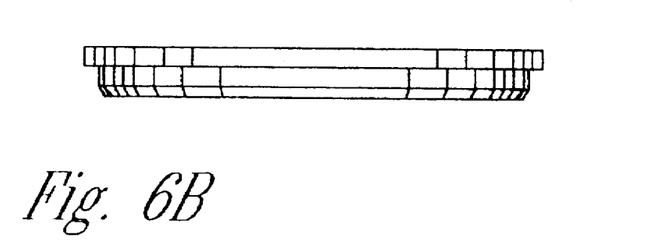
Figure 6C:
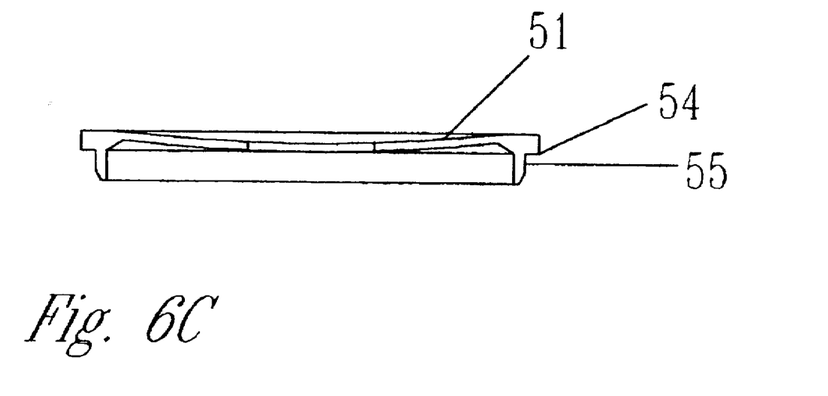

Next, FIG. 6, shows top, side, and side cross-sectional views of the top plate 50. Viewed from the top, plate 50 is annular, with its top 51 having an outer diameter approximately equal to the interior diameter of the vertical mount 40. Top 51 also has a central hole 52 to allow escape of vapors (at a predetermined rate) from the vertical mount during the cooking process. As can be seen from the side cross-sectional view, top plate 50 also has a shallow cylindrical wall 55 extending downwardly from its (concave) top 51. There is also a lip 54 extending around the cylindrical part of the top plate 50, which serves to limit the depth to which the cylindrical part of the top plate 50 may be inserted into the inside of the top of the vertical mount 30 and to also create a liquid-tight seal between the vertical mount 30 and the top plate 50.

Figure 7:
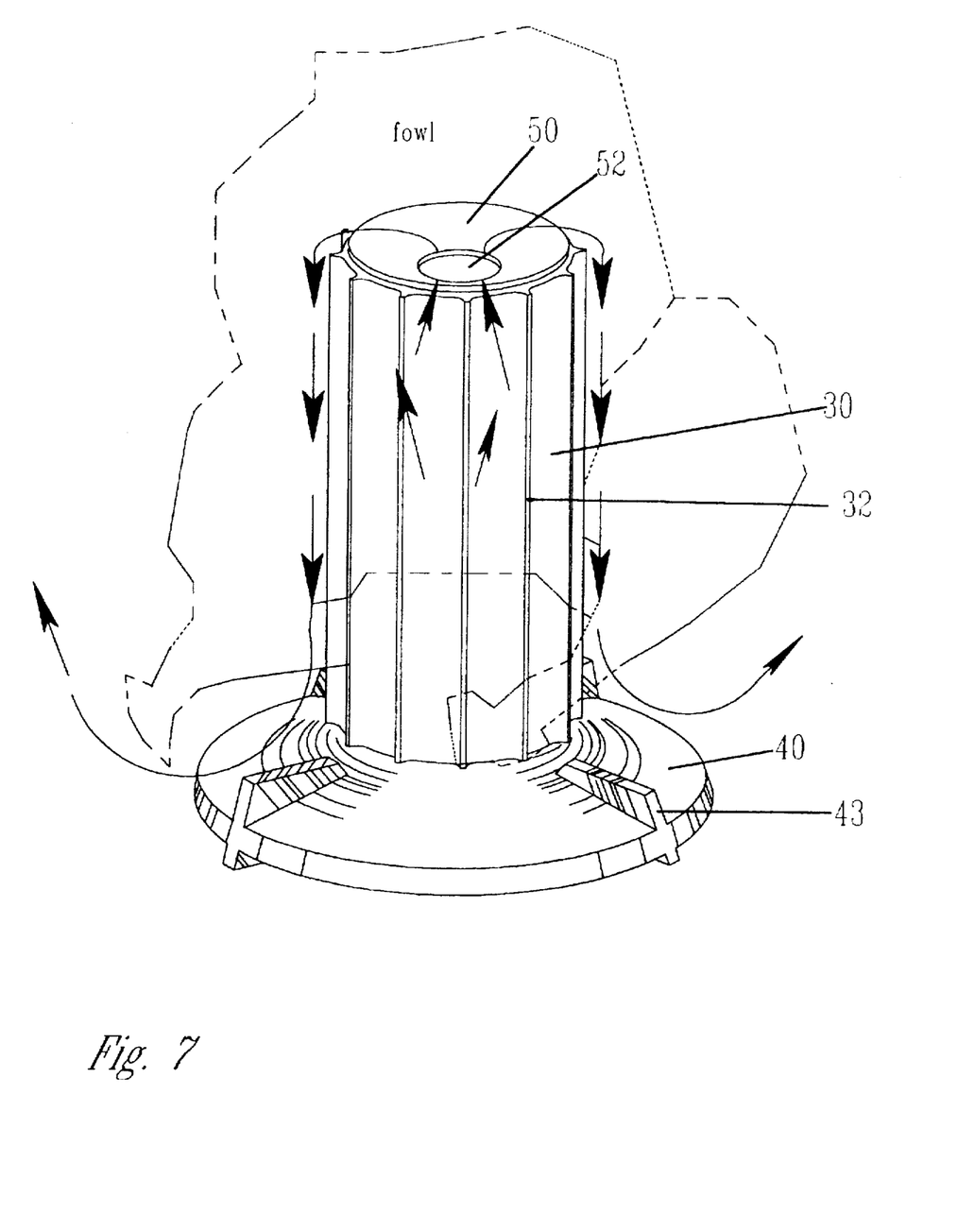
FIG. 7 shows an isometric view of cooking device with fowl in place showing vapor flow.

Looking now at FIG. 7, the cooking device is shown in isometric view, fully assembled, with a dressed fowl in place. The component parts are the base plate 40, a vertical mount 30, and a top plate 50. FIG. 7 shows how vapors that have escaped from the vertical mount 30 through hole 52 are then forced throughout the body cavity of the fowl.

In use, the heat conducting vertical mount 30 of the preferred embodiment, having been snugly placed on the upwardly projecting cylinder 44 of the base plate 40, holds the fowl in a vertical attitude allowing the fats and oils to drain away into a cooking pan. Because the base plate 40 has a series of ribs 43, the mounted fowl is prevented from sinking down onto the base plate 40 and contacting fats and oils which have drained away from the fowl in the cooking process, thereby greatly reducing the amount of any retained fats or oils in the cooked fowl.

Figure 8:
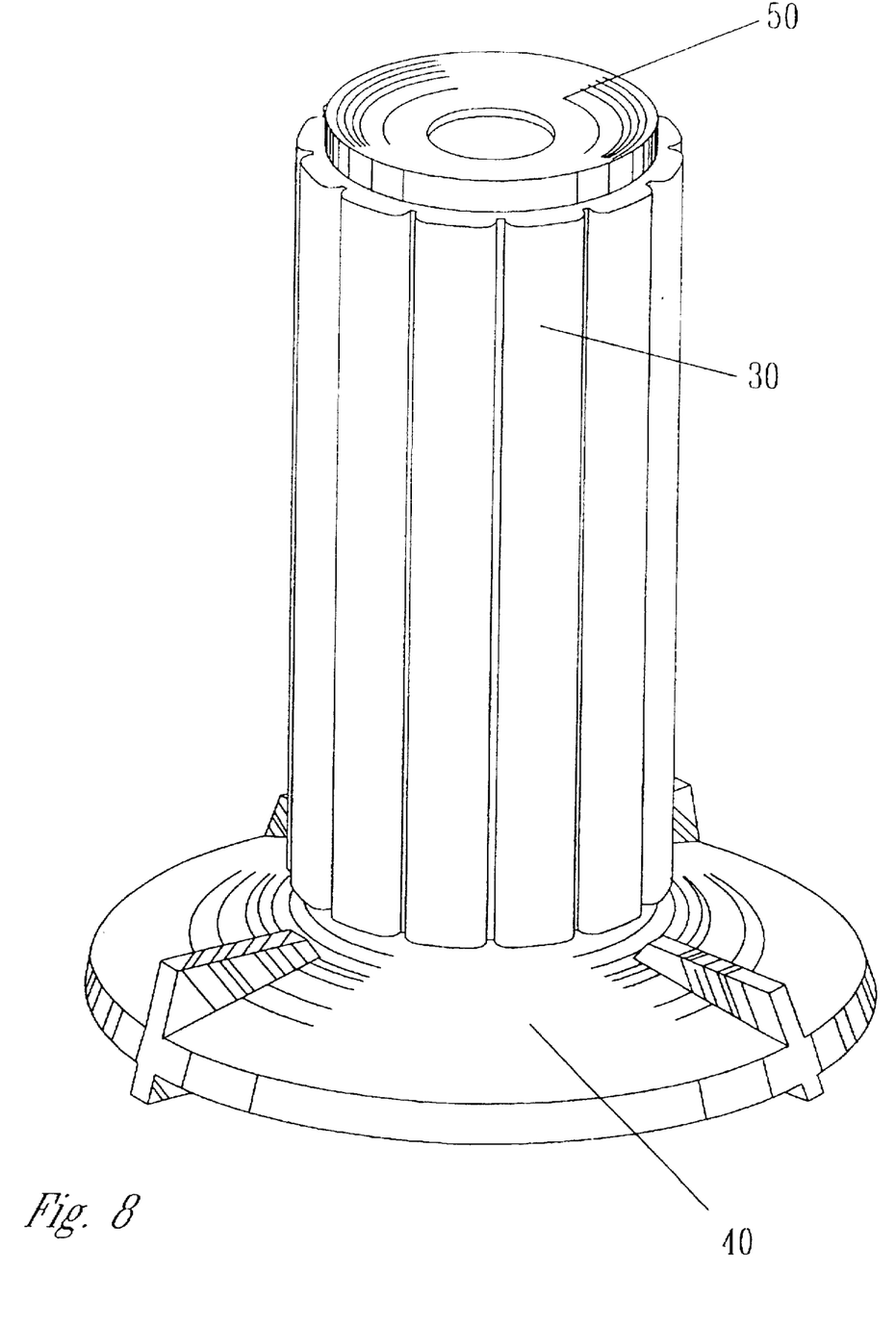
FIG. 8 shows an isometric view of an alternative embodiment having channels instead of fins.

As the fowl cooks, the vertical mount 30 (including its escaping gases), aided by fins 32, transfers heat into the interior body cavity of the fowl. As a result, the cooking process is not only "outside-in," but also "inside-out," and the prolonged cooking times (along with the consequent overcooking of the fowl's outer meat areas) previously necessary to adequately roast a fowl are rendered unnecessary. Depending on the particular configuration, the cooking conditions, the fowl, and other factors, the fins 32 may promote the transfer of heat into the interior of the fowl through multiple mechanisms. First, the fins 32 may increase the amount of heat available to vertical mount 30 (in addition to the heat available through conduction from base plate 40) by directly exposing the vertical mount (especially its lower region, and including the fins 32 themselves), to convective transfer of heat from the surrounding heated chamber. This increased heat in vertical mount 30 (including its fins 32) is then available for transfer into the interior of the fowl directly through conduction (via the ends of the fins 32), through radation (by way of the outer surfaces of vertical mount 30), or through the vaporization and release of the contained liquids. At the same time, the fins 32 may also promote convective transfer of heat into the interior cavity of the cooking fowl directly from the surrounding heated chamber. Finally, as discussed below, the fins 32 allow for more thorough perfusion of the escaping vapors from the interior of vertical mount 30 for convective heating (and conductive/phase change heating to the degree that vapors recondense on the surface of the interior cavity of the fowl) of the interior of the cooking fowl. Different embodiments could be made wherein the fins 32 have a greater width to increase the conductive heating of the fowl, or the present invention could simply omit the fins 32 (along with the liquid vaporization aspect discussed below) so that virtually all heating of the interior cavity was conductive. If the fins 32 were omitted, channels 33 (see FIG. 8) might be provided on the exterior of the mount 32 to promote drainage.

In the embodiment shown, the hollow interior of mount 30 can be partially filled with various liquids, because the seal between cylinder 44 and the bottom of mount 30 is liquid-tight, and, with the exception of its hole 52, the top plate 50 seals the top of the interior of the vertical mount. During cooking, the contained liquids vaporize and escape out from the interior of the mount 30 and into the interior cavity of the fowl, helping to keep the cooked meat of the fowl moist throughout while still being completely cooked, but not overcooked, dry, or tough. The fins 32 prevent excessive contact of the inside of the body cavity with the outer walls of the vertical mount, thereby providing paths for the vapors to move throughout and out from the body cavity of the fowl during cooking. The interior of the vertical mount 30 can also be partially filled with additives such as spices, which will vaporize together with the contained liquids during cooking, infusing the meat with additional flavors and enhancing overall taste. The hole 52 has a specific size that is predetermined (based in part upon the size of the interior of the vertical mount and the anticipated cooking time) to allow contained vapors to escape at a predetermined rate into the body cavity of the fowl, so that the vaporizing process and the presence of escaping vapors may last effectively throughout the cooking cycle. Also, the hole 52 could be of size that can be varied by the user so as to increase the conditions under which the cooking device may be beneficially employed.

I claim:

1. A device for improving the process of cooking fowl in a heated chamber, comprising:
  (i) an elongate vertical mount oriented vertically with respect to gravity and formed to fit inside the interior cavity of the fowl, said vertical mount having a hollow interior region and a top plate including an aperture said aperture having a reduced size to constrain the rate of vapor release from said hollow interior region when heated, and;
  (ii) a base plate having an upper and a lower surface and connected to said vertical mount and shaped to rest on a horizontal flat surface of the heated chamber,
wherein when the fowl to be cooked is placed over said mount, the fowl is held thereby in a position that allows ready drainage of liquids exuded during cooking.

2. The device of claim 1, further comprising upwardly extending ribs on the upper surface of said base plate, whereby contact of the fowl with liquids drained from the fowl is prevented.

3. The device of claim 1, further comprising ridges on the lower surface of said base plate.

4. The device of claim 1, further comprising vertical fins on the exterior surface of said mount, said fins extending far enough from the surface of said mount as to promote the drainage of liquids from the fowl during cooking.

5. The device of claim 4, wherein said fins are shaped to help hold the fowl in place.

6. The device of claim 1, further comprising vertical channels placed along the vertical length of the exterior surface of said mount, said channels extending inwardly enough from the surface of said mount as to promote the drainage of liquids from the fowl during cooking.

7. The device of claim 1, wherein said mount includes a top plate at the top of said mount, said top plate being readily removable from the rest of said mount so as to allow facile cleaning and facile introduction of liquid into the hollow region of mount.

8. The device of claim 1, wherein said base plate is readily removable from said mount.

9. The device of claim 1, further comprising vertical channels placed along the vertical length of the exterior surface of said mount, wherein said channels provide passageways for escaping vapors to perfuse throughout and leave the interior cavity of the fowl during cooking.

10. The device of claim 1, further comprising vertical fins on the exterior surface of said mount, wherein said fins provide passageways for escaping vapors to perfuse throughout and leave the interior cavity of the fowl during cooking.

11. The device of claim 10, wherein said fins extend far enough away from the exterior surface of said mount as to promote convective heating of the mount and/or the interior cavity of the fowl.

12. The device of claim 1, wherein the lower end of said vertical mount is open and the connection between said base plate and said vertical mount is liquid-tight.

13. The device of claim 1, wherein the lower end of said vertical mount is closed such that liquid may be contained in said mount whether or not it is connected to said base plate.

14. The device of claim 1, wherein a liquid may be introduced into a separate cup within said mount.

15. A device for improving the process of cooking fowl in a heated chamber, comprising a highly heat conductive insert that is shaped to fit into the interior cavity of the fowl, said insert including a hollow interior region, an aperture, and a cup within said insert for the introduction of liquid, said insert being heated by the heated chamber.

16. A device for improving the process of cooking fowl in a heated chamber, comprising a highly heat conductive insert that is shaped to fit into the interior cavity of the fowl, and an electric heating element embedded in the insert.

17. The device of claim 16, wherein the majority of the exterior surface of said insert is in physical contact with the interior of the fowl.

18. A device for improving the process of cooking fowl in a heated chamber, comprising a microwave activatible, microwave-safe insert that is shaped to fit into the interior cavity of the fowl.

19. The device of claim 18, wherein the majority of the exterior surface of said insert is in physical contact with the interior of the fowl.

* * * * *